(12) United States Patent
Inoue

(10) Patent No.: US 12,311,933 B2
(45) Date of Patent: May 27, 2025

(54) DRIVING SUPPORT APPARATUS AND DRIVING SUPPORT METHOD

(71) Applicant: TOYOTA JIDOSHA KABUSHIKI KAISHA, Toyota (JP)

(72) Inventor: Shintaro Inoue, Kanagawa-ken (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 179 days.

(21) Appl. No.: 18/234,950

(22) Filed: Aug. 17, 2023

(65) Prior Publication Data

US 2024/0067175 A1    Feb. 29, 2024

(30) Foreign Application Priority Data

Aug. 23, 2022    (JP) .................. 2022-132545

(51) Int. Cl.
     *B60W 30/14*      (2006.01)
     *B60W 30/095*      (2012.01)
     *B60W 40/04*      (2006.01)
     *B60W 60/00*      (2020.01)

(52) U.S. Cl.
     CPC ...... *B60W 30/143* (2013.01); *B60W 30/0956* (2013.01); *B60W 40/04* (2013.01); *B60W 60/001* (2020.02); *B60W 2554/4029* (2020.02)

(58) Field of Classification Search
     CPC ...... B60W 10/02; B60W 10/06; B60W 10/08; B60W 20/40; B60W 30/14; B60W 30/143; B60W 60/001; B60W 30/0956; B60W 40/04; B60W 2554/4029
     USPC ...................................................... 701/22, 93
     See application file for complete search history.

(56) References Cited

U.S. PATENT DOCUMENTS

| | | |
|---|---|---|
| 8,255,110 B2 | 8/2012 | Taguchi |
| 8,364,394 B2 | 1/2013 | Taguchi |
| 8,428,812 B2 | 4/2013 | Taguchi |
| 8,660,778 B2 | 2/2014 | Taguchi |
| 8,830,044 B2 * | 9/2014 | Fukamachi ............ G08G 1/165 701/301 |
| 9,058,247 B2 * | 6/2015 | Fukamachi ............... G06T 7/73 |
| 9,067,571 B2 | 6/2015 | Matsunaga |
| 9,096,266 B2 | 8/2015 | Irie |
| 9,352,779 B2 | 5/2016 | Kindo et al. |

(Continued)

FOREIGN PATENT DOCUMENTS

| | | |
|---|---|---|
| JP | 2017-206117 A | 11/2017 |
| JP | 2021-142788 A | 9/2021 |

*Primary Examiner* — Andrew Joseph Rudy
(74) *Attorney, Agent, or Firm* — Dinsmore & Shohl LLP (57) ABSTRACT

A driving support apparatus assists driving of a vehicle by performing control of the vehicle corresponding to a blind spot. A driving support apparatus stores risk estimation information for calculating a risk estimation value indicating a height of a risk of a blind spot, and determines a plurality of blind spots as one conglomerate risk when the plurality of blind spots are detected in front of a vehicle and satisfy a predetermined condition. When the conglomerate risk exists, the driving support apparatus calculates a risk estimation value indicating the height of the risk in each of the plurality of blind spots on the basis of the risk estimation information, and determines a control end position for ending the control of the vehicle corresponding to the blind spot and a target passing speed of the control end position of the vehicle on the basis of the risk estimation value.

5 Claims, 10 Drawing Sheets

(56) References Cited

U.S. PATENT DOCUMENTS

| | | | |
|---|---|---|---|
| 9,886,852 B2 | 2/2018 | Urano | |
| 10,048,699 B2 | 8/2018 | Inoue et al. | |
| 10,611,383 B2 * | 4/2020 | Bae | G08G 1/167 |
| 11,767,010 B2 * | 9/2023 | Sugaya | B60W 10/18 |
| | | | 701/26 |
| 12,148,303 B2 * | 11/2024 | Yoshitake | G08G 1/167 |
| 2020/0348682 A1 | 11/2020 | Kamata | |
| 2021/0284141 A1 | 9/2021 | Sugaya | |
| 2024/0253619 A1 * | 8/2024 | Pantano-De-Luca | |
| | | | B60W 30/09 |

* cited by examiner

|  | Blind spot 1 | Blind spot 2 |
|---|---|---|
| Single risk estimation value | 10 | 40 |
| Control ending position | Choosing blind spot 2 (40 > 10) | |
| Conglomerate risk estimation value | 10 + 40 = 50 | |

(1)

|  | Blind spot 1 | Blind spot 2 |
|---|---|---|
| Single risk estimation value | 40 | 10 |
| Control ending position | Choosing blind spot 1 (40 > 10) | |
| Conglomerate risk estimation value | 40 + 10 = 50 | |

|  |  | Blind spot by parking vehicle (α) | Blind spot by intersection (β) |
|---|---|---|---|
| F1 | Type of area | Residential section : 30<br>City area : 10<br>Arterial road : 5 | Residential section : 50<br>City area : 30<br>Arterial road : 15 |
| F2 | Width of road | 0 - 3m : 20<br>3 - 5m : 10<br>5m - : 2 | 0 - 3m : 16<br>3 - 5m : 10<br>5m - : 4 |
| F3 | Sidewalk | Existing : 5<br>Not existing : 20 | Existing : 6<br>Not existing : 33 |
| F4 | Height of blind spot | 0 - 5m : 15<br>5m - : 20 | 0 - 5m : 10<br>5m - : 25 |
| .... | .... | .... | .... |

DRIVING SUPPORT APPARATUS AND DRIVING SUPPORT METHOD

CROSS-REFERENCE TO RELATED APPLICATION

The present application claims priority under 35 U.S.C. § 119 to Japanese Patent Application No. 2022-132545, filed Aug. 23, 2022, the contents of which application are incorporated herein by reference in their entirety.

BACKGROUND

Field

The present disclosure relates to an apparatus and method for supporting driving of a vehicle.

Background Art

JP2017-206117A discloses a driving support apparatus for supporting a driver of a vehicle. The driving support apparatus detects an obstacle in front of the vehicle. Then, the driving support apparatus determines a driving path assuming a hypothetical moving body, which is a potential risk existing in a blind spot caused by the obstacle. In this way, the driving support apparatus performs support in consideration of an unrevealed risk, for example a pedestrian who rushes out of the blind spot.

SUMMARY

The present disclosure relates to a driving support apparatus. The driving support apparatus supports driving of a vehicle by controlling the vehicle in consideration of a potential risk existing in a blind spot. The present disclosure provides a technique capable of performing appropriate control for a plurality of blind spots.

A first aspect of the present disclosure relates to a driving support apparatus. The driving support apparatus stores risk estimation information and conducts driving support of a vehicle responding to a blind spot in front of the vehicle. The driving support apparatus detects a plurality of blind spots meeting a predetermined condition in front of the vehicle and determines the plurality of blind spots as a conglomerate risk. Then, the driving support apparatus calculates a single risk estimation value, which indicates a level of a risk of each of the plurality of blind spots, and a conglomerate risk estimation value, which indicates a level of a risk of an entire conglomerate risk, based on the risk estimation information. The conglomerate risk estimation value is a total value of the single risk estimation values of the blind spots included in the conglomerate risk. The driving support apparatus ends the driving support at a position at which the vehicle passes a blind spot having a highest single risk estimation value. The driving support apparatus determines target passing speed of the vehicle at a position at which the driving support is ended in accordance with the conglomerate risk estimation value.

A second aspect of the present disclosure relates to a driving support method.

The driving support method includes:
- conducting driving support of a vehicle responding to a blind spot in front of the vehicle;
- detecting a plurality of blind spots meeting a predetermined condition in front of the vehicle;
- determining the plurality of blind spots as a conglomerate risk;
- acquiring risk estimation information for calculating a level of a risk of a blind spot;
- calculating a single risk estimation value based on the risk estimation information, the single risk estimation value indicating a level of a risk of each of the plurality of blind spots;
- calculating a conglomerate risk estimation value indicating a level of a risk of an entire conglomerate risk, the conglomerate risk estimation value being a total value of the single risk estimation values of the blind spots included in the conglomerate risk;
- ending the driving support at a position at which the vehicle passes a blind spot having a highest single risk estimation value; and
- determining target passing speed of the vehicle at a position at which the driving support is ended in accordance with the conglomerate risk estimation value.

According to the technique of the present disclosure, in conducting driving support of a vehicle responding to a blind spot in front of the vehicle, it is possible to perform appropriate control for a plurality of blind spots.

DETAILED DESCRIPTION

Embodiments of the present disclosure will be described with reference to the accompanying drawings.

1. Conglomerate Risk

Figure 1:
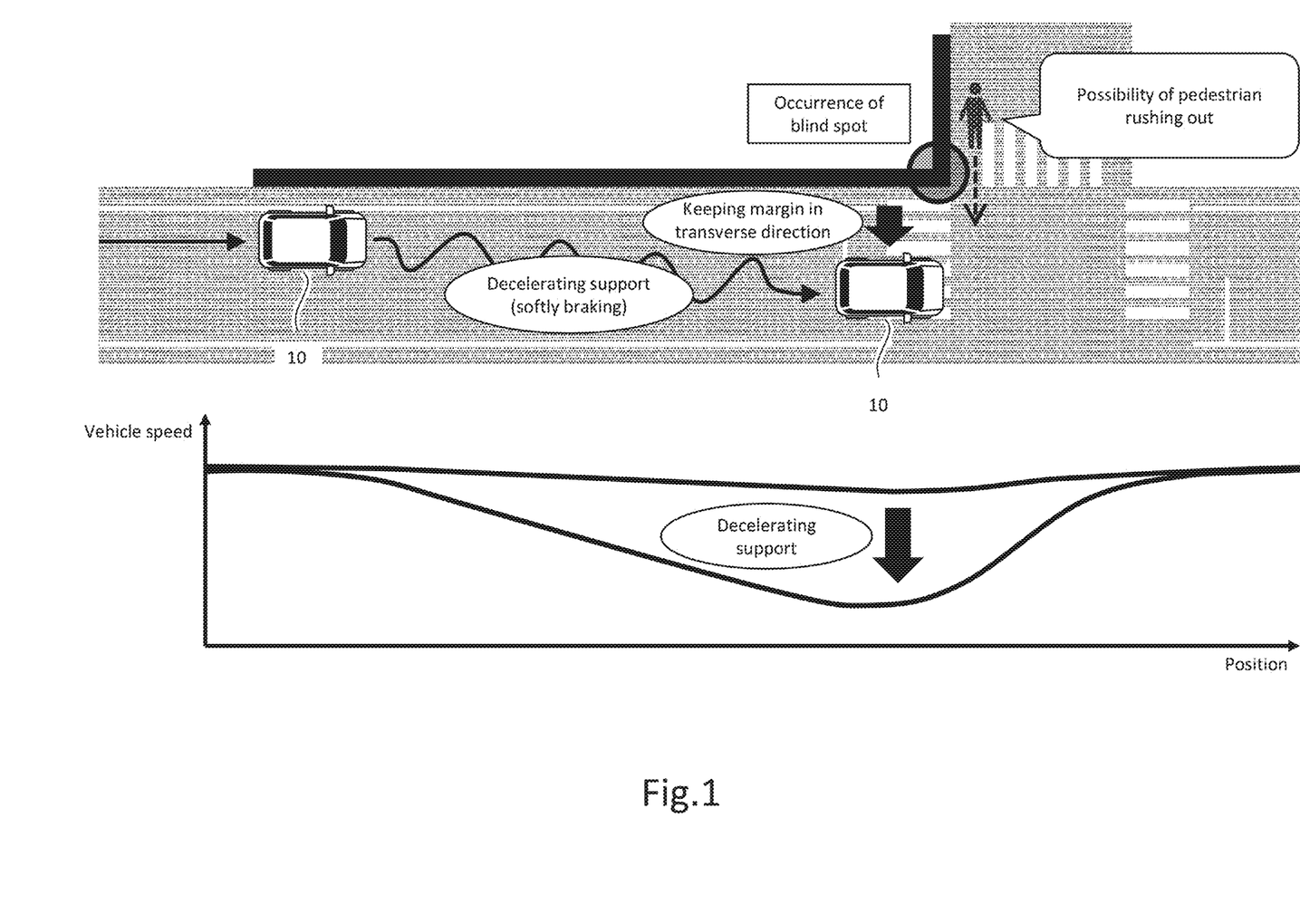
FIG. 1 is a conceptual diagram for explaining a blind spot.

A shape of a road, a parked vehicle on the road, or the like may cause a blind spot for a vehicle traveling on the road. If there is a blind spot, there is a possibility that an unexpected moving body jumps out, and there is a risk that the vehicle will not decelerate in time and will collide with the moving body that has jumped out of the blind spot. Therefore, when a blind spot is detected in front of the vehicle, the driving support apparatus according to the present embodiment supports driving of the vehicle by the driver or the automatic driving apparatus by performing control of the vehicle corresponding to the blind spot. FIG. 1 shows, as an example of a blind spot, a blind spot formed by a blind intersection. In preparation for a possibility that a moving body such as a pedestrian jumps out, the driving support apparatus performs deceleration support for reducing the vehicle speed of the vehicle 10 at the time of passing through the blind spot by gentle braking, and lateral margin securement for controlling the traveling track of the vehicle 10 so as to secure a sufficient distance to the blind spot. By these controls performed by the driving support apparatus, it is possible to increase the possibility that the vehicle 10 can avoid a collision even when the moving body suddenly jumps out from the blind spot.

Figure 2:
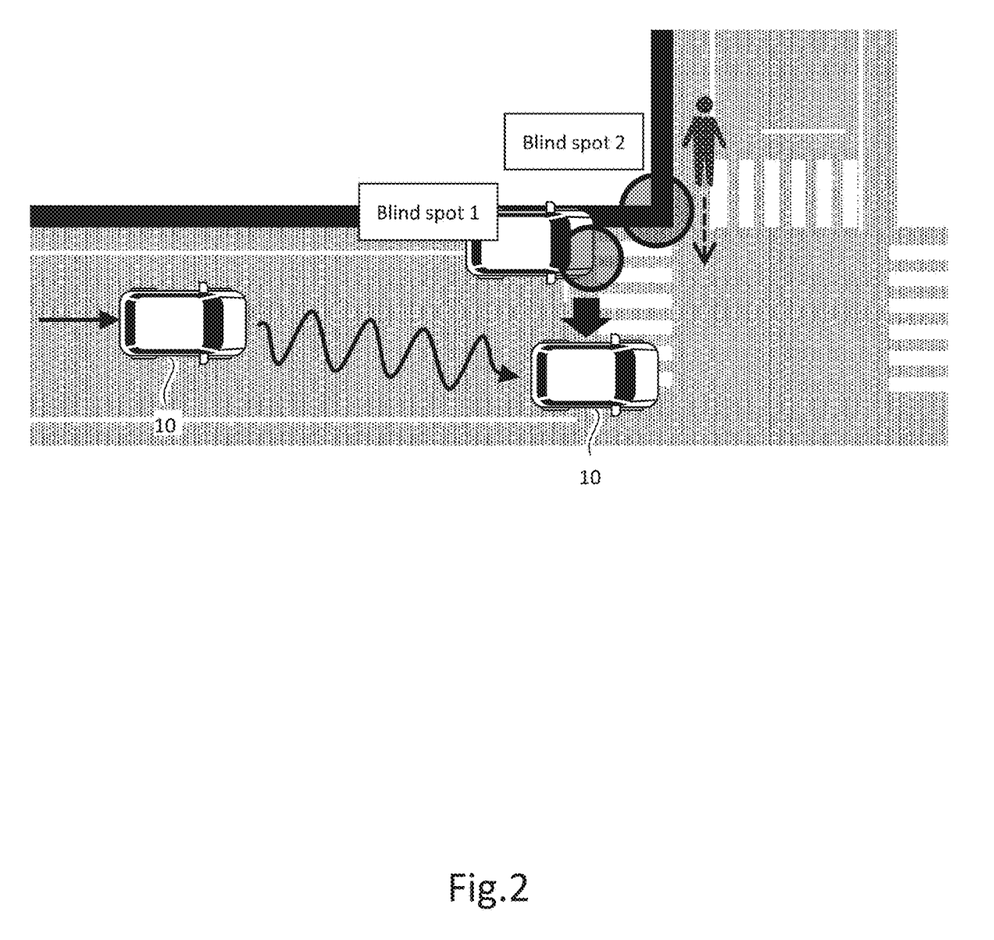
FIG. 2 is a conceptual diagram for explaining a plurality of blind spots.

A plurality of blind spots may be continuously present on the road. In the example of FIG. 2, a blind spot formed by a parked vehicle is present as a first blind spot, and a blind spot formed by an intersection is present as a second blind spot. Even when there are a plurality of blind spots, the driving support apparatus controls the vehicle 10 to secure a lateral margin or to support deceleration. However, in a case where there are a plurality of blind spots, if control is performed independently for each blind spot, there is a possibility that the traveling track and the vehicle speed of the vehicle 10 fluctuate irregularly and the driver of the vehicle 10 feels uncomfortable. In addition, in a case where there are a plurality of blind spots, the risk of occurrence may be greater than in a case where there is only one blind spot. Therefore, when a plurality of blind spots detected in front of the vehicle 10 satisfy a predetermined condition, the driving support apparatus treats the plurality of blind spots as a "conglomerate risk" and as a group of risks. Then, by collectively performing control for all of the plurality of blind spots, it is possible to reduce the annoyance of the driver while sufficiently preparing for the risk.

Specifically, in order to secure a lateral margin for one blind spot, when the traveling track of the vehicle 10 that has run out of the traveling lane does not return to the original traveling lane before passing through the next blind spot, the driving support apparatus treats the plurality of blind spots as a congratulate risk. The driving trajectory of the vehicle 10 is calculated by a driving support apparatus for controlling the vehicle 10. At this time, a condition may be set in advance for the running track calculated by the driving support apparatus. For example, a condition that the lateral acceleration is equal to or less than 0.2 G may be set in advance so that the vehicle 10 does not move suddenly. The driving support apparatus calculates the traveling track of the vehicle 10 according to such a condition and then determines whether the vehicle 10 can return to the original traveling lane.

Figure 3:
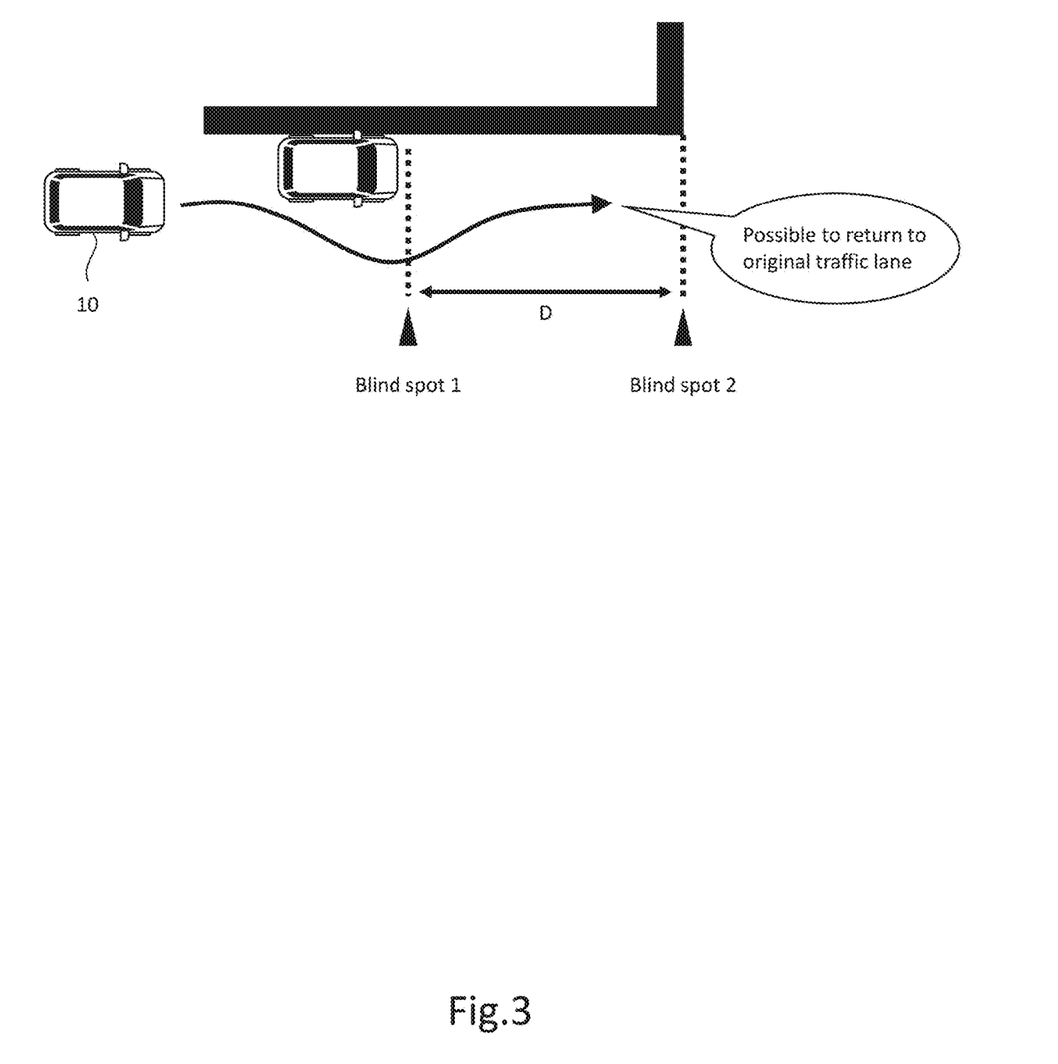
FIG. 3 is a diagram for explaining a situation in which a plurality of blind spots is not determined as a conglomerate risk.
Figure 4:
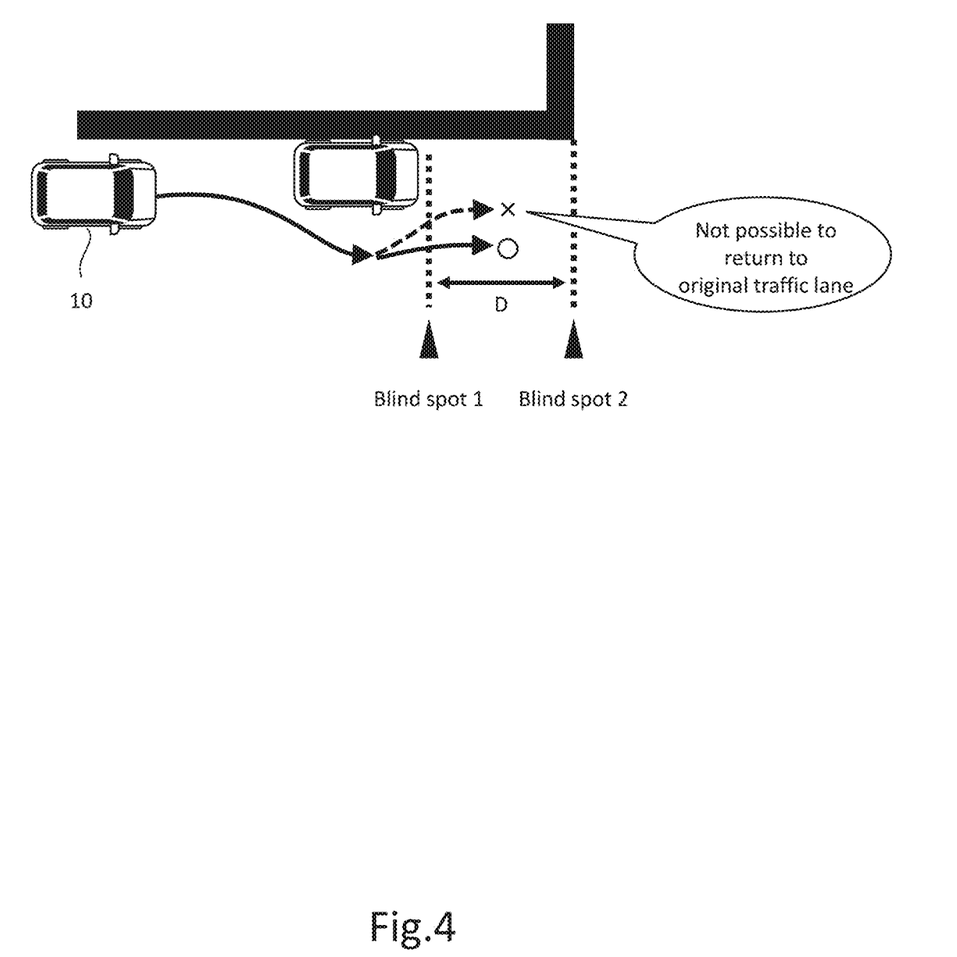
FIG. 4 is a diagram for explaining a situation in which a plurality of blind spots is determined as a conglomerate risk.

In the example of FIG. 3, since the distance D between the blind spot 1 and the blind spot 2 is sufficient, the vehicle 10 that runs off the driving lane in order to ensure a lateral margin with respect to the blind spot 1 can return to the original driving lane before passing through the blind spot 2. In this case, the driving support apparatus does not treat the blind spot 1 and the blind spot 2 as a convergent risk and independently controls the blind spots 1 and 2. On the other hand, in the example of FIG. 4, since the distance D between the blind spot 1 and the blind spot 2 is relatively short, the vehicle 10 that runs off the driving lane in order to ensure a lateral margin with respect to the blind spot 1 cannot return to the original driving lane before passing through the blind spot 2. In such a case, the driving support apparatus treats the blind spot 1 and the blind spot 2 as a convergent risk and integrally controls the vehicle 10 for driving support. The same applies to a case where three or more blind spots are present. For example, in the example of FIG. 4, when the traveling track of the vehicle 10 cannot return to the original traveling lane until the vehicle 10 passes through the blind spot 3 located next to the blind spot 2, the blind spot 1, the blind spot 2, and the blind spot 3 are treated as a conglomerate risk.

Whether or not the vehicle 10 can return to the original driving lane is affected by the distance D between the first blind spot and the second blind spot, the vehicle speed, the road width, and the like. For example, when the distance D is sufficiently long or the vehicle speed of the vehicle 10 is low, the possibility that the vehicle 10 can return to the original driving lane is high. Further, if the road width is wide, the amount by which the vehicle 10 protrudes from the original driving lane in order to ensure the lateral margin becomes small, and the possibility that the vehicle 10 can return to the original driving lane becomes high.

2. Determination of the Controlled Variable

In the case where the blind spots are continuously present, there is a possibility that the risk that the blind spot is generated is larger than that in the case where the blind spot is singly present. Therefore, in a case where the driving support apparatus treats a plurality of blind spots as a conglomerate risk, it is important to appropriately set a control amount, particularly an amount and timing of deceleration support. If the speed at the time of passing through the blind spot is not sufficiently reduced, it is not possible to sufficiently prepare for the risk. On the other hand, if the speed is excessively reduced or the distance traveled by the reduced speed is excessively long, the driver feels annoyed. Therefore, the driving support apparatus calculates an index indicating the magnitude of the risk caused by the blind spot as a "risk estimation value" and determines the control amount based on the risk estimation value. Information for calculating the risk estimation value is stored in advance by the driving support apparatus as risk estimation information. Among the risk estimation values, a value indicating the magnitude of the risk generated by each blind spot included in the cluster risk is referred to as a single risk estimation value. The control amount is determined based on the single risk estimation value.

Figure 5:
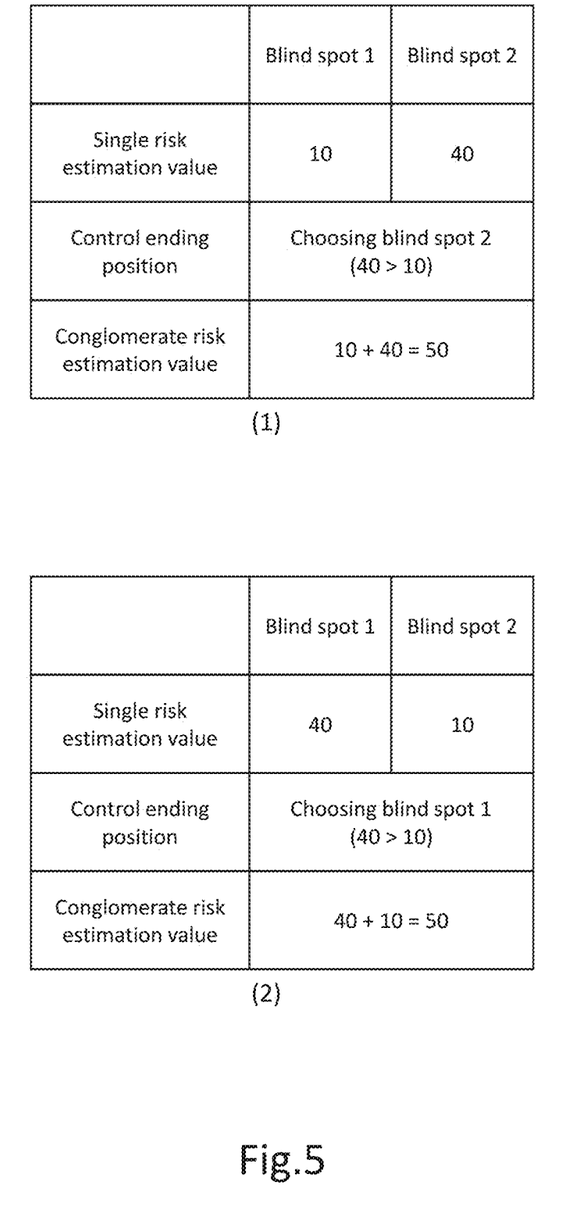
FIG. 5 is a diagram showing tow tables for explaining a relationship between a single risk estimation value and a control amount.

FIG. 5 shows two tables corresponding to cases of (1) and (2). In the two tables, examples of the relationship between the risk estimation value and the control amount when the blind spot 1 and the blind spot 2 are treated as a conglomerate risk are shown. As illustrated in FIG. 5, the control end position at which the driving support apparatus ends the control of the vehicle 10 corresponding to the blind spot may be determined as the position of the blind spot having the highest single risk estimation value among the blind spots included in the cluster risk. Since the driver is generally aware of the position of the blind spot having the highest risk when considering the position to be passed at the lowest speed, the control by the driving support apparatus can be matched with the feeling of the driver by determining the control end position in this way.

In addition, the driving support apparatus determines the target passing speed when the vehicle 10 passes through the control end position, that is, the position of the blind spot having the highest single risk estimation value, based on the single risk estimation value. The driving support apparatus first calculates a conglomerate risk estimation value indicating the magnitude of the overall risk of the conglomerate risk based on the single risk estimation value. Then, the target passing speed is determined so that the target passing speed becomes lower as the conglomerate risk estimation value becomes larger and the target passing speed becomes higher as the conglomerate risk estimation value becomes smaller. Here, the conglomerate risk estimation value is the sum of the single risk estimation values of the blind spots included in the conglomerate risk. Since the driver is generally aware of the magnitude of the risk by regarding a plurality of blind spots as one cluster when considering the risk caused by the blind spots, the amount of deceleration support performed by the driving support apparatus can be matched with the sense of the driver by setting the cluster risk estimation value in this manner.

Figure 6:
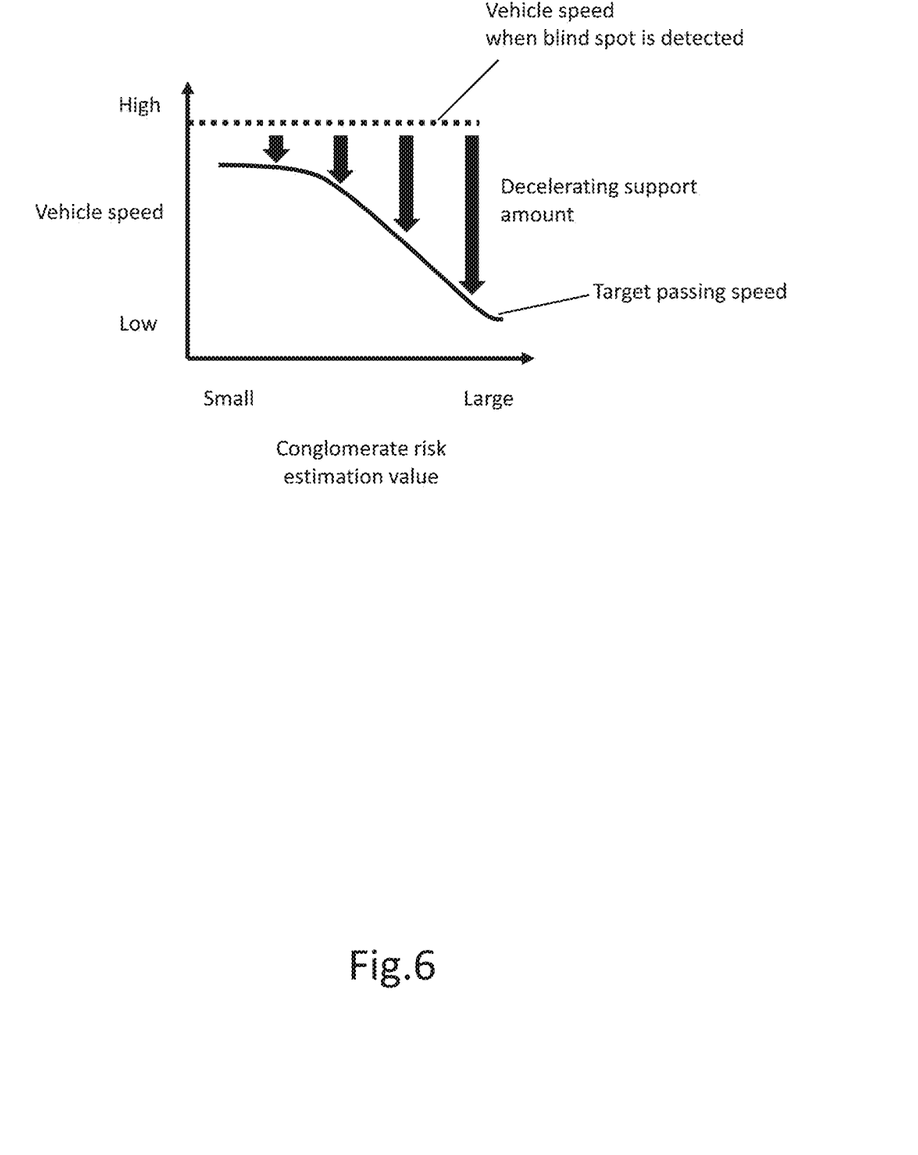
FIG. 6 is a graphic diagram for explaining a relationship between a conglomerate risk estimation value and a decelerating support amount.

The graph of FIG. 6 shows the relationship between the conglomerate risk estimation value and the target passing speed. The larger the conglomerate risk estimation value is, the higher the risk of occurrence of a plurality of blind spots is, and the target passing speed is set to be low so as to increase preparation for the risk. Assuming that the vehicle speeds at the time of blind spot detection are the same, the amount of deceleration support performed by the driving support apparatus in order to reduce the vehicle speed to the target passing speed increases as the converge risk estimation value increases. By determining the control amount based on the risk estimation value in this way, it is possible to make the control amount appropriate.

3. Time Chart

Figure 7:
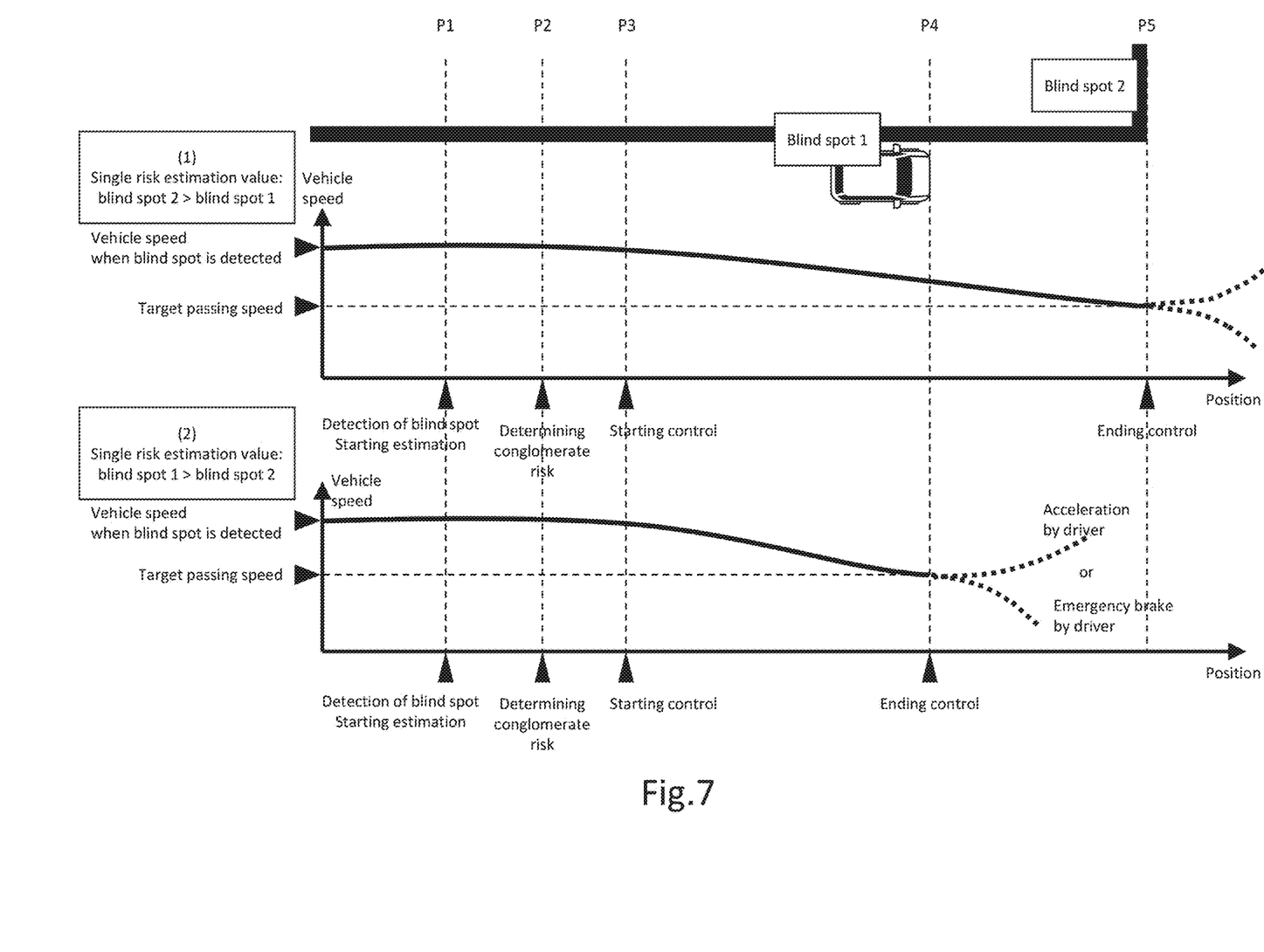
FIG. 7 is a time chart for explaining control performed by a driving support apparatus according to the present embodiment.

Control of the vehicle 10 performed by the driving support apparatus will be specifically described with reference to a time chart. FIG. 7 shows the transition of the vehicle speed when there are a blind spot 1 and a blind spot 2 which are treated as a conglomerate risk. The upper time chart corresponds to the case of (1) in the table of FIG. 5, and the lower time chart corresponds to the case of (2) in the table of FIG. 5.

At the point P1, the driving support apparatus detects a blind spot. The driving support apparatus that has detected the blind spot starts estimating the driving trajectory of the vehicle 10 and the magnitude of the risk of the blind spot. The driving support apparatus determines whether to treat the blind spot 1 and the blind spot 2 detected by estimating the driving trajectory as the convergent risk, and determines that the blind spot 1 and the blind spot 2 are treated as the convergent risk at the point P2. Therefore, the driving support apparatus calculates the single risk estimation values of the blind spot 1 and the blind spot 2 until the control is started at the point P3 at the latest, and determines the convergent risk estimation value, the target passing speed, and the control end position based on the single risk estimation values. The point P3 at which the control is started is, for example, a point at which an arrival time to the blind spot 1 located first among the blind spots included in the crowd risk, that is, a value obtained by dividing a distance to the blind spot 1 by a current speed of the car 10 is less than a predetermined value.

The driving support apparatus gradually decelerates the vehicle 10 so as to reach the target passing speed at the control end position. At this time, an upper limit (for example, 0.2 G) of the deceleration may be determined in advance so that the deceleration support by the gentle brake is performed. As described above, the control end position and the target passing speed are determined based on the single risk estimation values of the blind spot 1 and the blind spot 2. Since the target passing speed is determined according to the conglomerate risk estimation value which is the sum of the single risk estimation values, the target passing speed is equal in the cases (1) and (2) of FIG. 7. On the other hand, the control end position is set to the point P5 which is the position of the blind spot 2 in (1) and the point P4 which is the position of the blind spot 1 in (2).

As a result, in (1), the vehicle speed when passing through the blind spot 1 is lower than the vehicle speed at the time of risk detection but higher than the vehicle speed when passing through the blind spot 2. Since the single risk estimation value is larger for the blind spot 2 than for the blind spot 1, the vehicle 10 needs more deceleration preparation for the blind spot 2. Therefore, it can be said that the target passing speed is set as the vehicle speed at the time of passing through the blind spot 2 and gentle deceleration is performed as appropriate control.

In the case of (2), the control by the driving support apparatus has already been completed at the time point when the blind spot 2 is passed. However, since deceleration is performed by the time of passing through the blind spot 1, the vehicle speed when passing through the blind spot 2 is reduced as compared with the case where there is no support by the driving support apparatus.

Therefore, even if the moving body suddenly jumps out of the blind spot 2, the possibility of avoiding a collision can be improved. As described above, even in the case of (2), it is possible to make the support by the driving support apparatus appropriate.

In both cases (1) and (2), when control by the driving support apparatus ends, the vehicle 10 returns to a state in which the vehicle 10 is controlled by the driver or the automatic driving apparatus. If the moving body jumps out of the blind spot, deceleration is performed by an emergency brake operated by the driver or the automatic driving device. If the moving body does not jump out or the like, acceleration is normally performed by the driver or the automatic driving device.

4. Method for Calculating Single Risk Estimation Value

The single risk estimation value is calculated by, for example, the following equation.

$$R1 = \alpha 1 \times F1 + \alpha 2 \times F2 + \alpha 3 \times F3 + \ldots \quad (1)$$

$$R2 = \beta 1 \times F1 + \beta 2 \times F2 + \beta 3 \times F3 + \ldots \quad (2)$$

Figure 8:
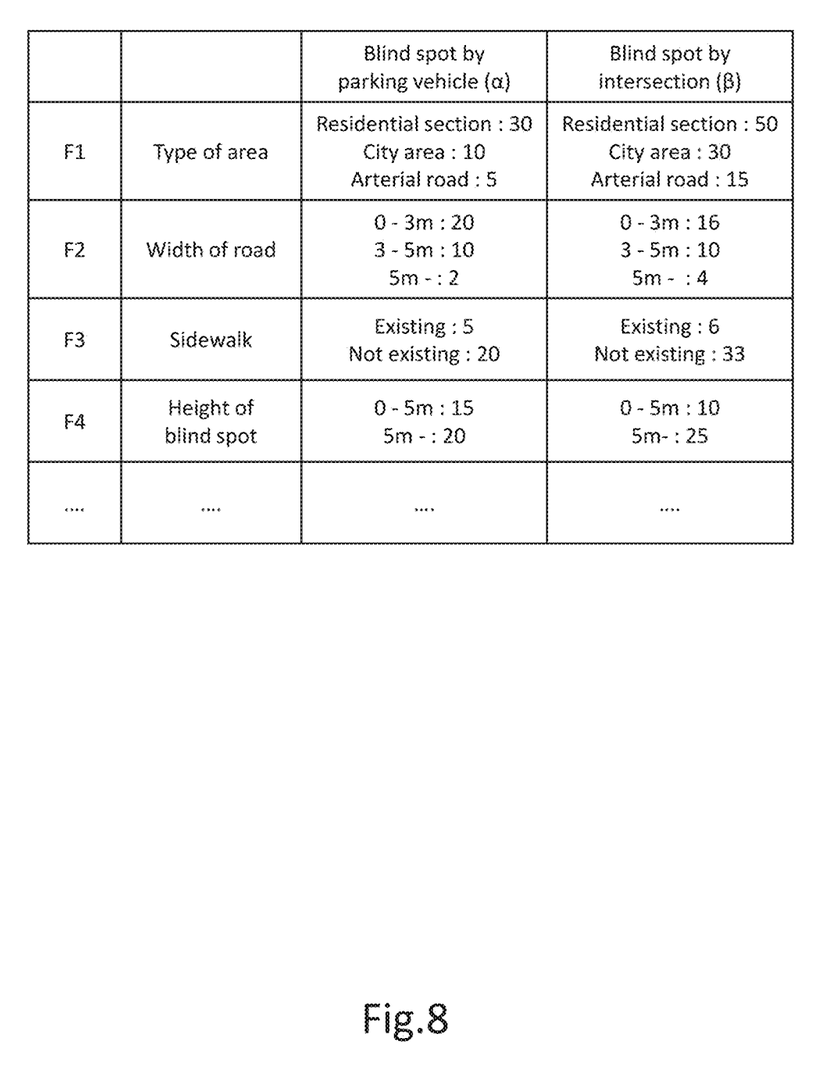
FIG. 8 is a table for explaining a method for calculating the single risk estimation value.

As described above, the single risk estimation value (R1, R2) is calculated based on the environmental factors (F1, F2, F3.) related to the target blind spot and the factor coefficients ($\alpha 1$, $\alpha 2$, $\alpha 3$. or $\beta 1$, $\beta 2$, $\beta 3$.). For example, as shown in the table of FIG. 8, the value of the environmental factor is determined by the blind spot or the environment around the blind spot. The driving support apparatus can acquire information on a blind spot or an environment around the blind spot for determining an environmental factor from information detected by an autonomous sensor mounted on the vehicle 10, map information stored in advance in the vehicle 10 or acquired from a server via a network, or the like. The factor coefficients are predetermined from statistically processed data. Different environmental factors and factor coefficients are selected depending on the type of the blind spot. For example, when the detected blind spot is a blind spot formed by an intersection, $\beta$ is selected as the factor coefficient, and the environmental factors are selected according to the right column of the table of FIG. 8. These pieces of information for calculating the single risk estimation value are included in the risk estimation information stored in the driving support apparatus.

5. Modified Example of Calculation of Conglomerate Risk Estimation Value

Figure 9:
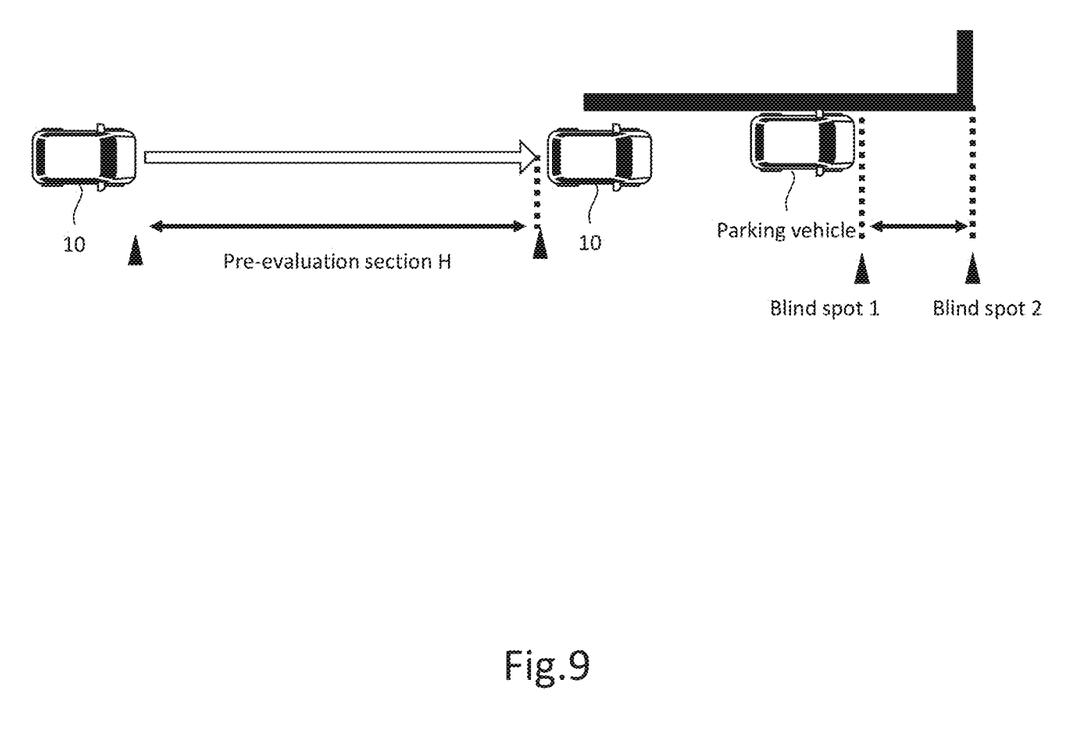
FIG. 9 is a diagram for explaining a pre-evaluation section.
Figure 10:
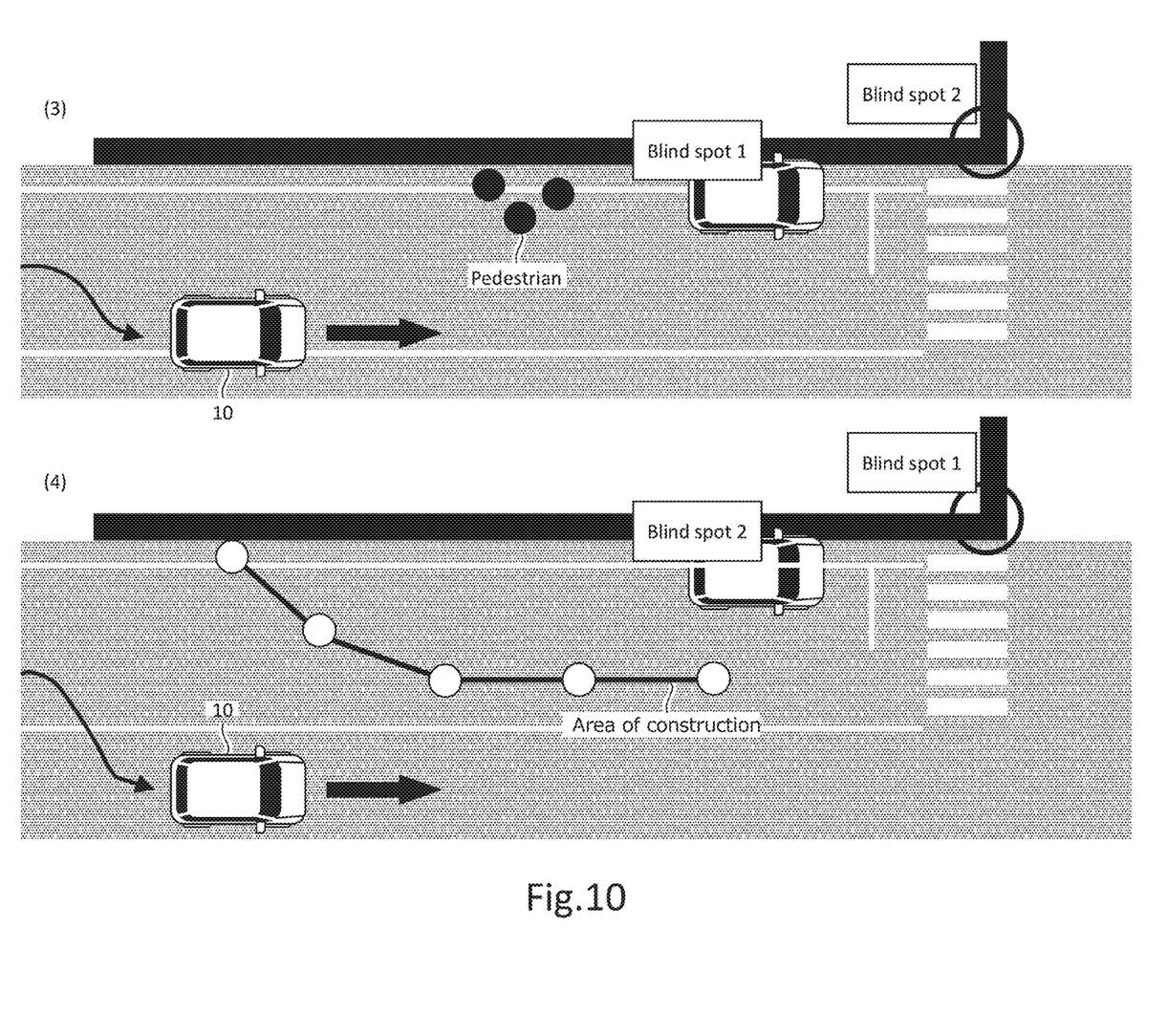
FIG. 10 is a diagram illustrating an example of a scene in which the driving support apparatus does not determine a plurality of blind spots as a conglomerate risk in a modification of determination of the conglomerate risk.

FIG. 10 shows a modified example of the method for calculating the conglomerate risk estimation value. In this example, as shown in FIG. 9, when a pre-evaluation section H is provided up to a point (point P1 in FIG. 7) at which the driving support apparatus detects a blind spot and a predetermined condition for the pre-evaluation section H is satisfied, the cluster risk estimation value is changed to a maximum value rather than a sum of single risk estimation values of blind spots included in the cluster risk. The predetermined condition for the pre-evaluation section H is that the sum of the number of pedestrians and the number of oncoming vehicles detected while the vehicle 10 is traveling in the pre-evaluation section H is equal to or less than a certain threshold value A. When this condition is satisfied, it means that the risk of the entire road is small, and it is relatively easy for the vehicle 10 to avoid the moving body that has jumped out of the blind spot by emergency braking or the like. Therefore, it is possible to relatively reduce the preparation for the conglomerate risk. Therefore, by making the conglomerate risk estimation value small to the same extent as when there is a blind spot of one of the conglomerate risks, it is possible to suppress excessive deceleration support and make driving comfortable for the driver.

The number of pedestrians and the number of oncoming vehicles can be detected by a camera or a LiDAR mounted on the vehicle 10. The threshold value A may be changed depending on the environment of the road on which the vehicle 10 the road on which the vehicle 10 travels. For example, in a situation where visibility is poor due to rainy weather or a situation where it is difficult to detect a moving body due to snowfall, the threshold value A may be decreased in consideration of a possibility that a risk due to a blind spot increases. The point at which the pre-evaluation section H starts may be stored in advance by the driving support apparatus as map information, or a new pre-evaluation section H may be started each time an intersection is detected.

6. Modified Example of Determination of Conglomerate Risk

In the above description, when the position of the vehicle 10 in the lateral direction cannot return to the original driving lane after passing through one blind spot until passing through the next blind spot, it is determined that the vehicle 10 is at a conglomerate risk. However, there may be a case where the vehicle 10 is not originally traveling in the leftmost lane and does not need to move in the lateral direction in order to secure a margin, or a case where the vehicle 10 is originally traveling outside the lane in order to avoid an object different from the object forming the blind spot. In this modified example, when the vehicle 10 is not traveling within the range of the leftmost lane at the blind spot detection time point, a plurality of blind spots are not treated as a convergent risk regardless of the distance between the blind spots.

FIG. 10 shows examples of two scenes in which it is not determined that there is a conglomerate risk in the modification. In the scene (3), the vehicle 10 is already driving out of the lane when the driving support apparatus detects the blind spot in order to ensure lateral spacing for the pedestrian. In the scene (4), the vehicle 10 has moved to an adjacent lane due to the construction site and is not already traveling in the leftmost lane when the driving support apparatus detects the blind spot. In such a case, the risk when the vehicle 10 travels on the road is more affected by factors other than the blind spot. Further, since the distance in the lateral direction with respect to the blind spot is already secured, it is considered that there is no need to increase the control amount. Therefore, in this modified example, even if a plurality of blind spots are detected in such a situation, the driving support apparatus does not treat it as a congratulate risk. As a result, it is possible to perform control in accordance with the driver's feeling.

What is claimed is:

1. A driving support apparatus configured to:
   conduct driving support of a vehicle responding to a blind spot in front of the vehicle;
   detect a plurality of blind spots meeting a predetermined condition in front of the vehicle;
   determine the plurality of blind spots as a conglomerate risk;
   calculate a single risk estimation value indicating a level of a risk of each of the plurality of blind spots;
   calculate a conglomerate risk estimation value indicating a level of a risk of an entire conglomerate risk, the conglomerate risk estimation value being a total value of the single risk estimation values of the blind spots included in the conglomerate risk;
   end the driving support at a position at which the vehicle passes a blind spot having a highest single risk estimation value; and
   determine target passing speed of the vehicle at a position at which the driving support is ended in accordance with the conglomerate risk estimation value.

2. The driving support apparatus according to claim 1, further configured to:
   calculate a first driving path responding only to a first blind spot included in the conglomerate risk; and
   determine that the plurality of blind spots meets the predetermined condition when the first driving path deviates from an original traffic lane and does not return to the original traffic lane before a second blind spot included in the conglomerate risk, the original traffic lane being a traffic lane in which the vehicle originally drives before the plurality of blind spots is detected, the second blind spot existing next behind to the first blind spot.

3. The driving support apparatus according to claim 2, wherein the predetermined condition further includes a condition that the original traffic lane is a lane closest to roadside and the vehicle drives within the lane closest to the roadside before the plurality of blind spots is detected.

4. The driving support apparatus according to claim 1, further configured to:
   calculate a total number of pedestrians and oncoming vehicles detected before a blind spot is detected; and
   change the conglomerate risk estimation value into a maximum value of single risk estimation values of blind spots included in the conglomerate risk when the total number is equal to or less than a predetermined threshold value.

5. A driving support method comprising:
   conducting driving support of a vehicle responding to a blind spot in front of the vehicle;

detecting a plurality of blind spots meeting a predetermined condition in front of the vehicle;

determining the plurality of blind spots as a conglomerate risk;

calculating a single risk estimation value indicating a level of a risk of each of the plurality of blind spots;

calculating a conglomerate risk estimation value indicating a level of a risk of an entire conglomerate risk, the conglomerate risk estimation value being a total value of the single risk estimation values of the blind spots included in the conglomerate risk;

ending the driving support at a position at which the vehicle passes a blind spot having a highest single risk estimation value; and determining target passing speed of the vehicle at a position at which the driving support is ended in accordance with the conglomerate risk estimation value.

\* \* \* \* \*